(12) United States Patent
Secomandi et al.

(10) Patent No.: US 11,606,197 B2
(45) Date of Patent: Mar. 14, 2023

(54) METHOD AND SYSTEM FOR ENCRYPTING AND DECRYPTING A FACIAL SEGMENT IN AN IMAGE

(71) Applicant: HCL Technologies Italy S.p.A., Vimodrone (IT)

(72) Inventors: Antonio Secomandi, Rome (IT); Viviana Tripodi, Rome (IT)

(73) Assignee: HCL Technologies Italy S.p.A., Rome (IT)

( * ) Notice: Subject to any disclaimer, the term of this patent is extended or adjusted under 35 U.S.C. 154(b) by 253 days.

(21) Appl. No.: 16/939,000

(22) Filed: Jul. 26, 2020

(65) Prior Publication Data
US 2022/0029789 A1 Jan. 27, 2022

(51) Int. Cl.
*H04L 9/08* (2006.01)
*G06V 40/16* (2022.01)

(52) U.S. Cl.
CPC ............ *H04L 9/083* (2013.01); *G06V 40/168* (2022.01); *G06V 40/172* (2022.01); *H04L 2209/16* (2013.01)

(58) Field of Classification Search
CPC ..... H04L 9/083; G06V 40/168; G06V 40/172
USPC ........................................................ 713/155
See application file for complete search history.

(56) References Cited

U.S. PATENT DOCUMENTS

| | | | | |
|---|---|---|---|---|
| 9,396,354 | B1 * | 7/2016 | Murphy | H04L 51/212 |
| 10,019,136 | B1 * | 7/2018 | Ozog | H04N 21/4223 |
| 10,027,727 | B1 * | 7/2018 | Ozog | G06Q 10/00 |
| 10,501,055 | B1 * | 12/2019 | Yi | B60R 25/257 |
| 2008/0298596 | A1 * | 12/2008 | Kuraki | G09C 5/00 380/283 |
| 2015/0104002 | A1 | 4/2015 | Ninan et al. | |
| 2016/0294781 | A1 * | 10/2016 | Ninan | H04L 63/0428 |
| 2018/0288031 | A1 * | 10/2018 | Kumar | H04L 63/0807 |
| 2019/0068566 | A1 * | 2/2019 | Gandhi | H04L 63/0876 |
| 2020/0186506 | A1 * | 6/2020 | Shockley | G06F 3/062 |
| 2021/0328801 | A1 * | 10/2021 | Sly | H04L 9/0894 |

FOREIGN PATENT DOCUMENTS

CN 108197453 B 2/2020

OTHER PUBLICATIONS

Pavel Korshunov, "Privacy-Preserving Photo Sharing based on a Secure JPEG".

* cited by examiner

*Primary Examiner* — Dereena T Cattungal
(74) *Attorney, Agent, or Firm* — Kendal Sheets

(57) ABSTRACT

This disclosure relates to method and system for encrypting and decrypting a facial segment in an image with a unique server key. The method includes receiving an image from one of a plurality of users. The image includes a plurality of facial segments. The method further includes, for each facial segment from the plurality of facial segments, identifying a unique user associated with the facial segment using a facial recognition algorithm, encrypting the facial segment with a unique server key, generating a protection frame, unlockable with the unique server key, to cover the facial segment, and decrypting the facial segment while rendering the image for at least one of the plurality of users upon receiving the unique server key from the at least one of the plurality of users.

15 Claims, 13 Drawing Sheets

METHOD AND SYSTEM FOR ENCRYPTING AND DECRYPTING A FACIAL SEGMENT IN AN IMAGE

TECHNICAL FIELD

This disclosure relates generally to image privacy protection, and more particularly to method and system for encrypting and decrypting a facial segment in an image with a unique server key.

BACKGROUND

Globally, social media has become an integral part of people's daily lives. In this age of information, transfer and sharing of data is increasing rapidly. Consequently, there are rising concerns regarding privacy protection of users, particularly in terms of sharing images. When an image includes multiple users and privacy of the image is controlled by publisher of the image, individual privacy is affected.

In the present state of art, techniques for providing privacy protection to users in an image make use of blurred layers over facial segments of each individual user. Each user may select custom facial segment visibility criteria for other users. However, in such techniques, the custom facial segment visibility criteria are stored in a centralized control matrix. Thus, ultimately, control over privacy of a facial segment is with the centralized control matrix and not the user. Further, in such techniques, original image is stored with the blurred layers in a single image file. Hence, elements for rendering the image are available within the single image file.

Other conventional techniques for protecting privacy of users include encryption of complete images. However, such techniques provide control of privacy protection to publisher of an image. In some scenarios, the image may include users other than the publisher. In such scenarios, the publisher may choose to define image visibility criteria other than the preferred image visibility criteria of each of the users in the image. For example, the publisher may provide viewing access for an image to a set of users. However, at least one of the users in the image may not desire to provide viewing access to some users from the set of users. In such situations, privacy of an individual may be affected.

In short, existing techniques fall short in providing a mechanism for providing a customized control to the users over the corresponding individual facial segments in an image. Further, existing techniques fail to include multiple participants in image rendering process.

SUMMARY

In one embodiment, a method for encrypting and decrypting a facial segment in an image with a unique server key is disclosed. In one example, the method may include receiving an image from one of a plurality of users. The image includes a plurality of facial segments. The method may further include, for each facial segment from the plurality of facial segments, identifying a unique user associated with the facial segment using a facial recognition algorithm. The unique user is one of the plurality of users. The method may further include, for each facial segment from the plurality of facial segments, encrypting the facial segment with a unique server key. The unique server key is shared with the unique user. The method may further include, for each facial segment from the plurality of facial segments, generating a protection frame, unlockable with the unique server key, to cover the facial segment. The protection frame includes an opaque or a partially opaque layer of pixels to hide the facial segment from the plurality of users. The method may further include for each facial segment from the plurality of facial segments, decrypting the facial segment while rendering the image for at least one of the plurality of users upon receiving the unique server key from the at least one of the plurality of users. The unique server key is shared with the at least one of the plurality of users by the unique user or upon permission from the unique user.

In one embodiment, a system for encrypting and decrypting a facial segment in an image with a unique server key is disclosed. In one example, the system may include a processor and a computer-readable medium communicatively coupled to the processor. The computer-readable medium may store processor-executable instructions, which, on execution, may cause the processor to receive an image from one of a plurality of users. The image includes a plurality of facial segments. The processor-executable instructions, on execution, may further cause the processor to identify, for each facial segment from the plurality of facial segments, a unique user associated with the facial segment using a facial recognition algorithm. The unique user is one of the plurality of users. The processor-executable instructions, on execution, may further cause the processor to encrypt, for each facial segment from the plurality of facial segments, the facial segment with a unique server key. The unique server key is shared with the unique user. The processor-executable instructions, on execution, may further cause the processor to generate, for each facial segment from the plurality of facial segments, a protection frame, unlockable with the unique server key, to cover the facial segment. The protection frame includes an opaque or a partially opaque layer of pixels to hide the facial segment from the plurality of users. The processor-executable instructions, on execution, may further cause the processor to decrypt, for each facial segment from the plurality of facial segments, the facial segment while rendering the image for at least one of the plurality of users upon receiving the unique server key from the at least one of the plurality of users. The unique server key is shared with the at least one of the plurality of users by the unique user or upon permission from the unique user.

In one embodiment, a non-transitory computer-readable medium storing computer-executable instructions for encrypting and decrypting a facial segment in an image with a unique server key is disclosed. In one example, the stored instructions, when executed by a processor, may cause the processor to perform operations including receiving an image from one of a plurality of users. The image includes a plurality of facial segments. The operations may further include identifying, for each facial segment from the plurality of facial segments, a unique user associated with the facial segment using a facial recognition algorithm, wherein the unique user is one of the plurality of users. The operations may further include encrypting, for each facial segment from the plurality of facial segments, the facial segment with a unique server key. The unique server key is shared with the unique user. The operations may further include generating, for each facial segment from the plurality of facial segments, a protection frame, unlockable with the unique server key, to cover the facial segment. The protection frame includes an opaque or a partially opaque layer of pixels to hide the facial segment from the plurality of users. The operations may further include decrypting, for each facial segment from the plurality of facial segments, the facial segment while rendering the image for at least one of the plurality of users upon receiving the unique server key from the at least one of the plurality of users. The unique server key is shared with the at least one of the plurality of users by the unique user or upon permission from the unique user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
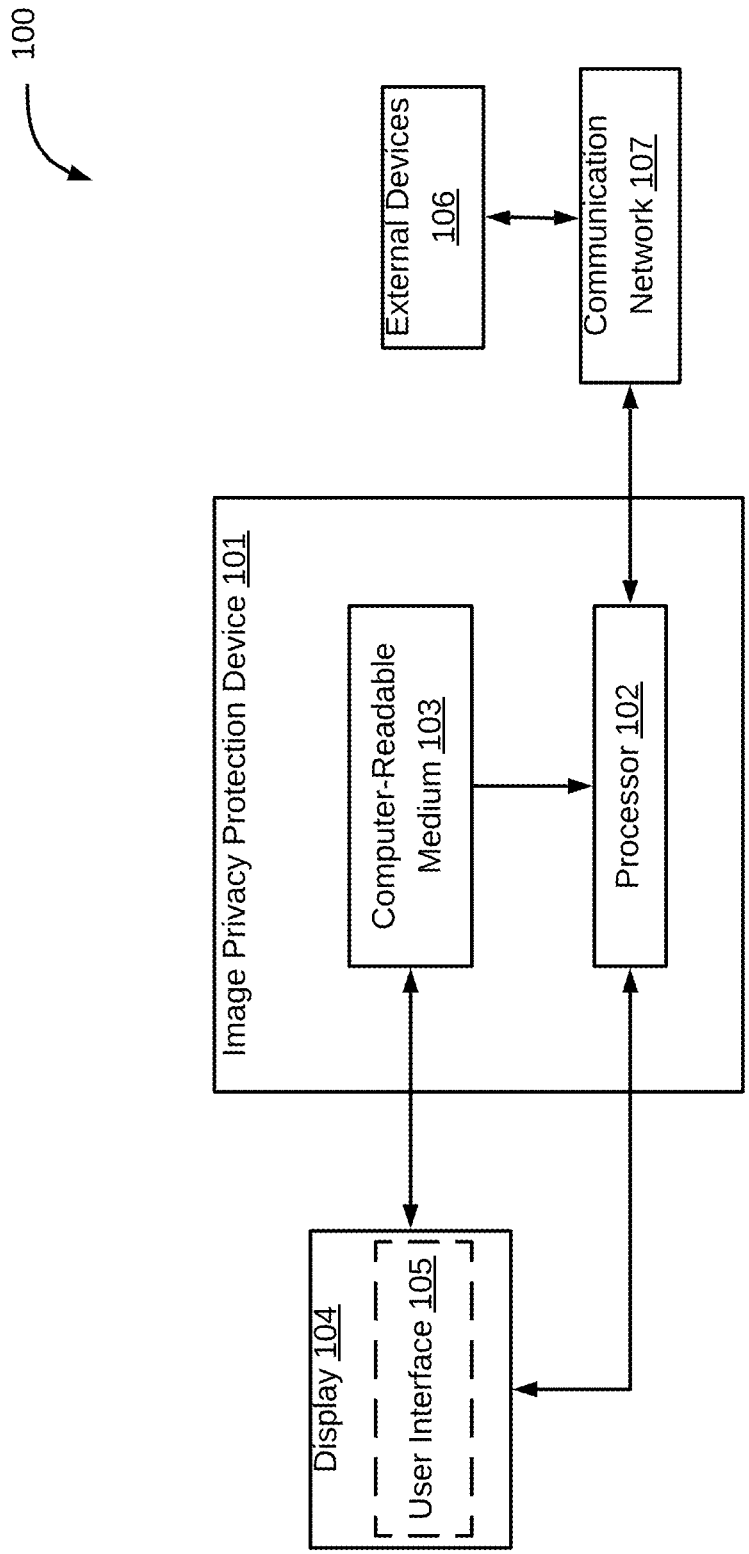
FIG. 1 is a block diagram of an exemplary system for encrypting and decrypting a facial segment in an image, in accordance with some embodiments of the present disclosure.

Referring now to FIG. 1, an exemplary system 100 for encrypting and decrypting a facial segment in an image is illustrated, in accordance with some embodiments of the present disclosure. The system 100 may implement in an image privacy protection engine, in accordance with some embodiments of the present disclosure. The image privacy protection engine may encrypt and decrypt the facial segment in the image with a unique server key. In particular, the system 100 may include an image privacy protection device 101 (for example, server, desktop, laptop, notebook, netbook, tablet, smartphone, mobile phone, or any other computing device) that may implement the image privacy protection engine. It should be noted that, in some embodiments, the image privacy protection device 101 may generate a protection frame, unlockable with the unique server key, to cover the facial segment in the image.

As will be described in greater detail in conjunction with FIGS. 2-11, the image privacy protection device may receive an image from one of a plurality of users. It should be noted that the image may include a plurality of facial segments. For each facial segment from the plurality of facial segments, the image privacy protection device may further identify a unique user associated with the facial segment using a facial recognition algorithm. The unique user may be one of the plurality of users. For each facial segment from the plurality of facial segments, the image privacy protection device may further encrypt the facial segment with a unique server key. The unique server key may be shared with the unique user. For each facial segment from the plurality of facial segments, the image privacy protection device may further generate a protection frame, unlockable with the unique server key, to cover the facial segment. It may be noted that the protection frame may include an opaque or a partially opaque layer of pixels to hide the facial segment from the plurality of users. For each facial segment from the plurality of facial segments, the image privacy protection device may further decrypt the facial segment while rendering the image for at least one of the plurality of users upon receiving the unique server key from the at least one of the plurality of users. The unique server key may be shared with the at least one of the plurality of users by the unique user or upon permission from the unique user.

In some embodiments, the image privacy protection device 101 may include one or more processors 102 and a computer-readable medium 103 (for example, a memory). The computer-readable medium 103 may include a plurality of facial segments of the image and a protection frame may be generated for each of the plurality of facial segments. Further, the computer-readable storage medium 103 may store instructions that, when executed by the one or more processors 102, cause the one or more processors 102 to encrypt a facial segment in an image with a unique server key, in accordance with aspects of the present disclosure. The computer-readable storage medium 103 may also store various data (for example, a plurality of facial segments, a protection frame for each of the plurality of facial segments, a unique server key associated with the protection frame, and the like) that may be captured, processed, and/or required by the system 100.

The system 100 may further include a display 104. The system 100 may interact with a user via a user interface 105 accessible via the display 104. The system 100 may also include one or more external devices 106. In some embodiments, the image privacy protection device 101 may interact with the one or more external devices 106 over a communication network 107 for sending or receiving various data. The external devices 106 may include, but may not be limited to, a remote server, a digital device, or another computing system.

Figure 2:
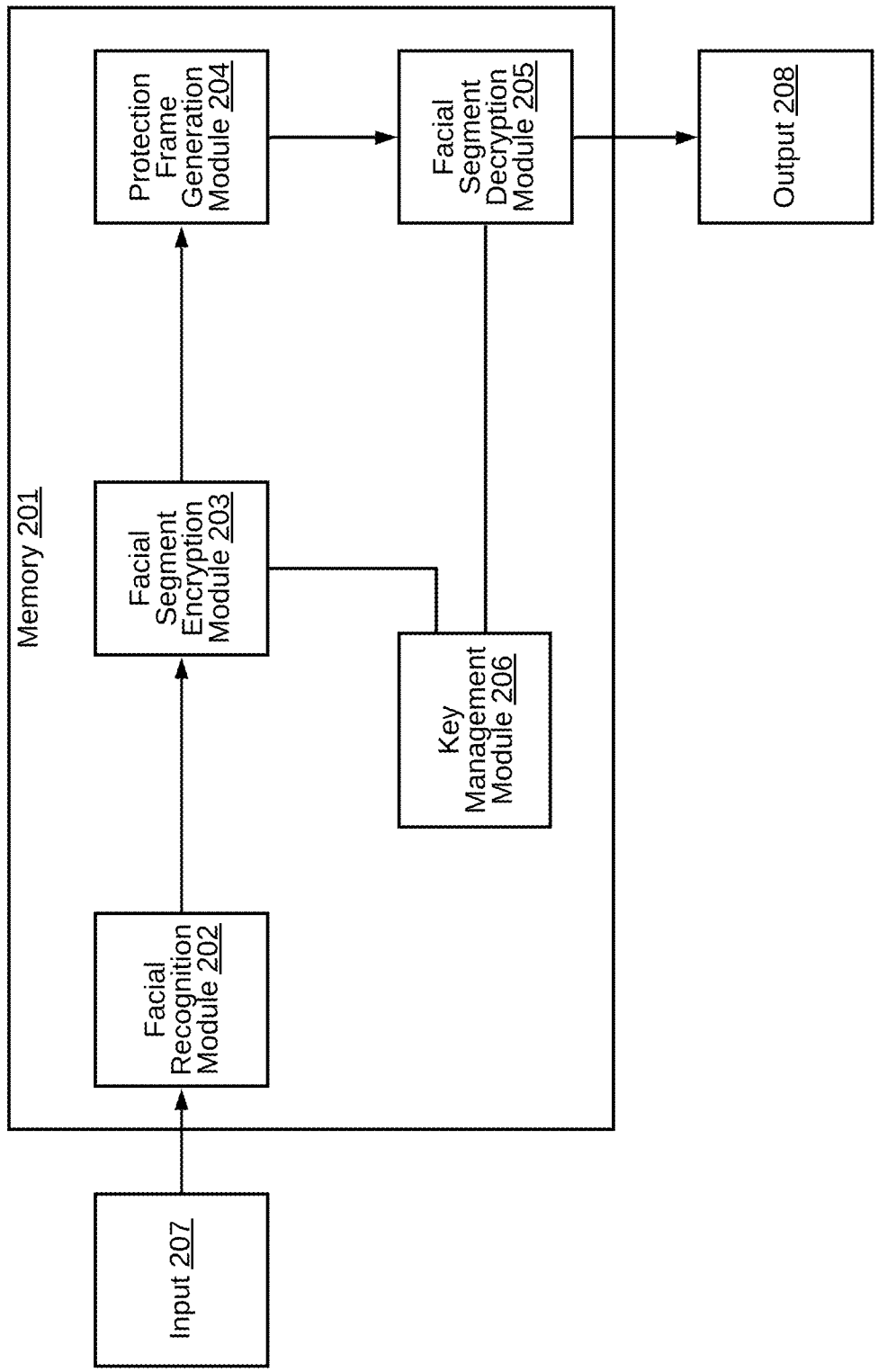
FIG. 2 is a functional block diagram of an image privacy protection device implemented by the exemplary system of FIG. 1, in accordance with some embodiments of the present disclosure.

Referring now to FIG. 2, a functional block diagram of an image privacy protection device 200 is illustrated, in accordance with some embodiments of the present disclosure. The image privacy protection device 200 may include, within a memory 201, a facial recognition module 202, a facial segment encryption module 203, a protection frame generation module 204, a facial segment decryption module 205, and a key management module 206. The memory 201 may receive an input 207 and provide an output 208. In some embodiments, the memory 201 may be analogous to the image privacy protection device 101 implemented by the system 100.

The facial recognition module 202 may receive an input 207 from one of a plurality of users. The input 207 may be an image, a part of an image, or image data. The input 207 may include a plurality of facial segments. Further, for each facial segment from the plurality of facial segments, the facial recognition module 202 may identify a unique user associated with the facial segment using a facial recognition algorithm. The unique user may be one of the plurality of users. By way of an example, the facial recognition algorithm may be principal component analysis, linear discriminant analysis, elastic bunch graph matching, hidden Markov model, multilinear subspace learning, a neuronal motivated dynamic link matching, and the like.

Further, the input 207 with the plurality of facial segments may be received by the facial segment encryption module 203. The facial segment encryption module 203 may encrypt the facial segment with a unique server key for each facial segment from the plurality of facial segments. It may be noted that the unique server key may be shared with the unique user. It may also be noted that a key provider for the unique server key is the server. Further, the unique server key may be sent to the key management module 206. In an embodiment, the key management module 206 may associate the unique server key with the unique user corresponding to the facial segment. Further, the unique user may provide a unique user key to the key management module 206. The unique user key may be a custom key generated by the user upon receiving the unique server key. The key management module 206 may replace the unique server key with the unique user key. When the key management module 206 replaces the unique server key with the unique user key, the key provider is established as the unique user.

Further, the facial segment encryption module 203 may send the unique server key associated with each facial segment from the plurality of facial segments to the protection frame generation module 204. The protection frame generation module 204 may generate a protection frame to cover the facial segment. The protection frame may be unlockable with the unique server key or the unique user key. In some embodiments, the protection frame may include an opaque or a partially opaque layer of pixels to hide the facial segment from the plurality of users. In an embodiment, the protection frame may be of a shape of the facial segment. In another embodiment, the protection frame may cover the facial segment completely and an extra area in the image (such as a rectangular or circular frame covering more than area covered by the facial segment). A user may require the unique server key or the unique user key to remove the protection frame from the image and clearly view the facial segment.

In some embodiments, the unique user may share the unique server key or the unique user key with at least one of the plurality of users upon receiving a key access request from the at least one of the plurality of users. In some other embodiments, the unique user may provide permission to the at least one of the plurality of users upon receiving the key access request from the at least one of the plurality of users. In each of the above mentioned scenarios, the at least one of the plurality of users may send the unique server key to the facial segment decryption module 205 to decrypt the facial segment. The facial segment decryption module 205 may decrypt the facial segment while rendering the image for at least one of the plurality of users upon receiving the unique server key or the unique user key from the at least one of the plurality of users. The above mentioned steps may be iteratively performed for each of the plurality of facial segments in the image to obtain a rendered image as the output 208. It may be noted that the output 208 may be user-specific. The output 208 may include an image with protection frames removed for each facial segment from the plurality of facial segment for which a user provides the unique server key or the unique user key. For example, in an image with 8 facial segments identified by the facial recognition module 202, the output 208 may be the rendered image with 5 facial segments without protection frames and 3 facial segments with the protection frames when the at least one user provides the unique server key or the unique user key for each of the 5 facial segments.

It should be noted that all such aforementioned modules 202-206 may be represented as a single module or a combination of different modules. Further, as will be appreciated by those skilled in the art, each of the modules 202-206 may reside, in whole or in parts, on one device or multiple devices in communication with each other. In some embodiments, each of the modules 202-206 may be implemented as dedicated hardware circuit comprising custom application-specific integrated circuit (ASIC) or gate arrays, off-the-shelf semiconductors such as logic chips, transistors, or other discrete components. Each of the modules 202-206 may also be implemented in a programmable hardware device such as a field programmable gate array (FPGA), programmable array logic, programmable logic device, and so forth. Alternatively, each of the modules 202-206 may be implemented in software for execution by various types of processors (e.g., processor 102). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for encrypting and decrypting a facial segment in an image with a unique server key. For example, the exemplary system 100 and the associated image privacy protection device 101, 200 may encrypt and decrypt a facial segment in an image with a unique server key by the processes discussed herein. In particular, as will be appreciated by those of ordinary skill in the art, control logic and/or automated routines for performing the techniques and steps described herein may be implemented by the system 100 and the associated image privacy protection device 101, 200 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
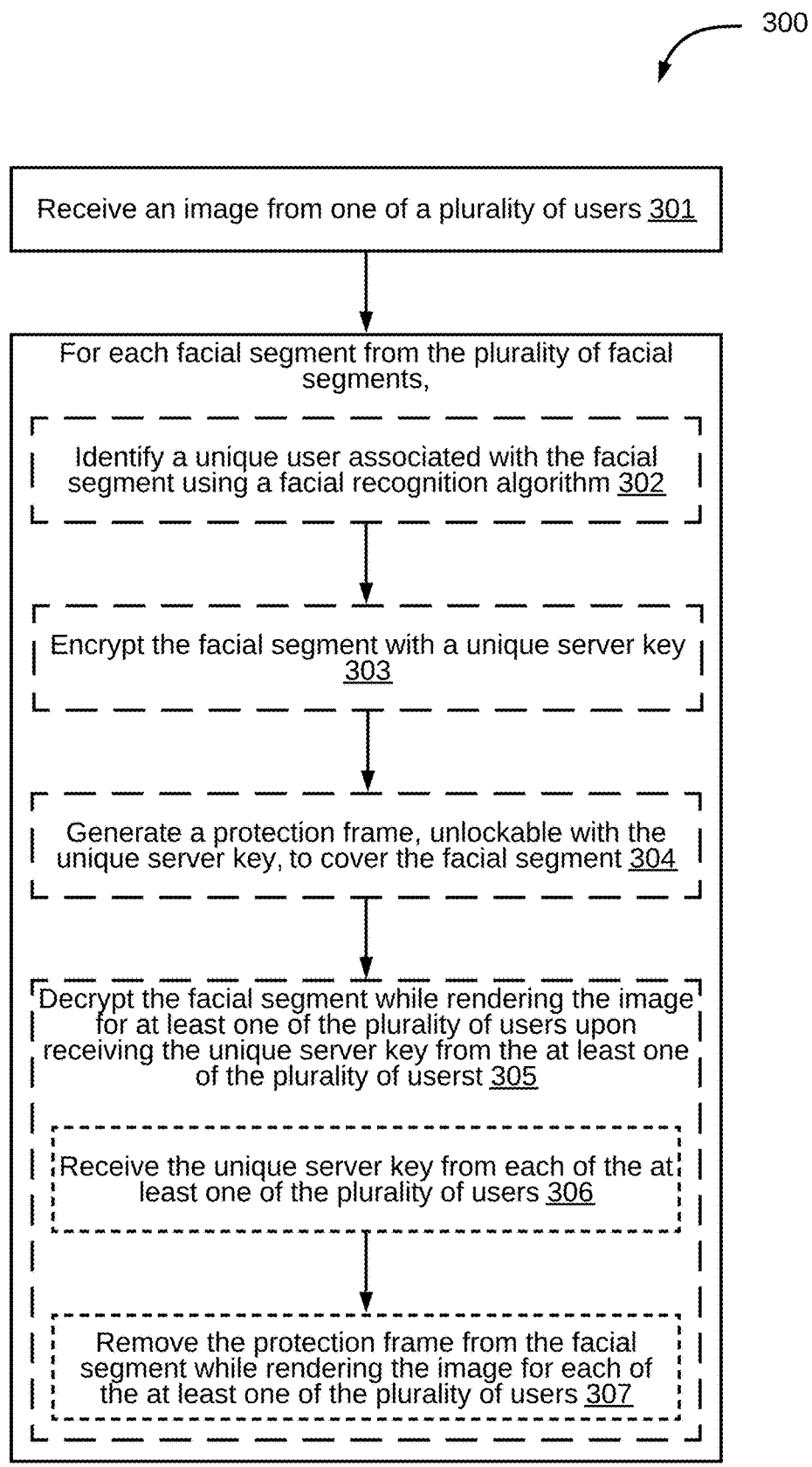
FIG. 3 illustrates a flow diagram of an exemplary process for encrypting and decrypting a facial segment in an image, in accordance with some embodiments of the present disclosure.

Referring now to FIG. 3, an exemplary process 300 for encrypting and decrypting a facial segment in an image with a unique server key is depicted via a flowchart, in accordance with some embodiments of the present disclosure. The process 300 may be implemented by the image privacy protection device 101 of the system 100. The process 300 may include receiving an image from one of a plurality of users, at step 301. It may be noted that the image includes a plurality of facial segments. Further, at step 302, for each facial segment from the plurality of facial segments, a unique user associated with the facial segment may be identified using a facial recognition algorithm. It may be noted that the unique user is one of the plurality of users. Further, the process 300 may include, for each facial segment from the plurality of facial segments, encrypting, the facial segment with a unique server key, at step 303. It should be noted that the unique server key is shared with the unique user.

Further, the process 300 may include, for each facial segment from the plurality of facial segments, generating a protection frame, unlockable with the unique server key, to cover the facial segment, at step 304. The protection frame includes an opaque or a partially opaque layer of pixels to hide the facial segment from the plurality of users. The image may be published upon encrypting the facial segment and generating the protection frame. Further, the process 300 may include, for each facial segment from the plurality of facial segments, decrypting the facial segment while rendering the image for at least one of the plurality of users upon receiving the unique server key from the at least one of the plurality of users, at step 305. It may be noted that the unique server key is shared with the at least one of the plurality of users by the unique user or upon permission from the unique user. Further, the step 305 may include receiving the unique server key from each of the at least one of the plurality of users, at step 306. Further, the step 305 may include removing the protection frame from the facial segment while rendering the image for each of the at least one of the plurality of users, at step 307.

Figure 4:
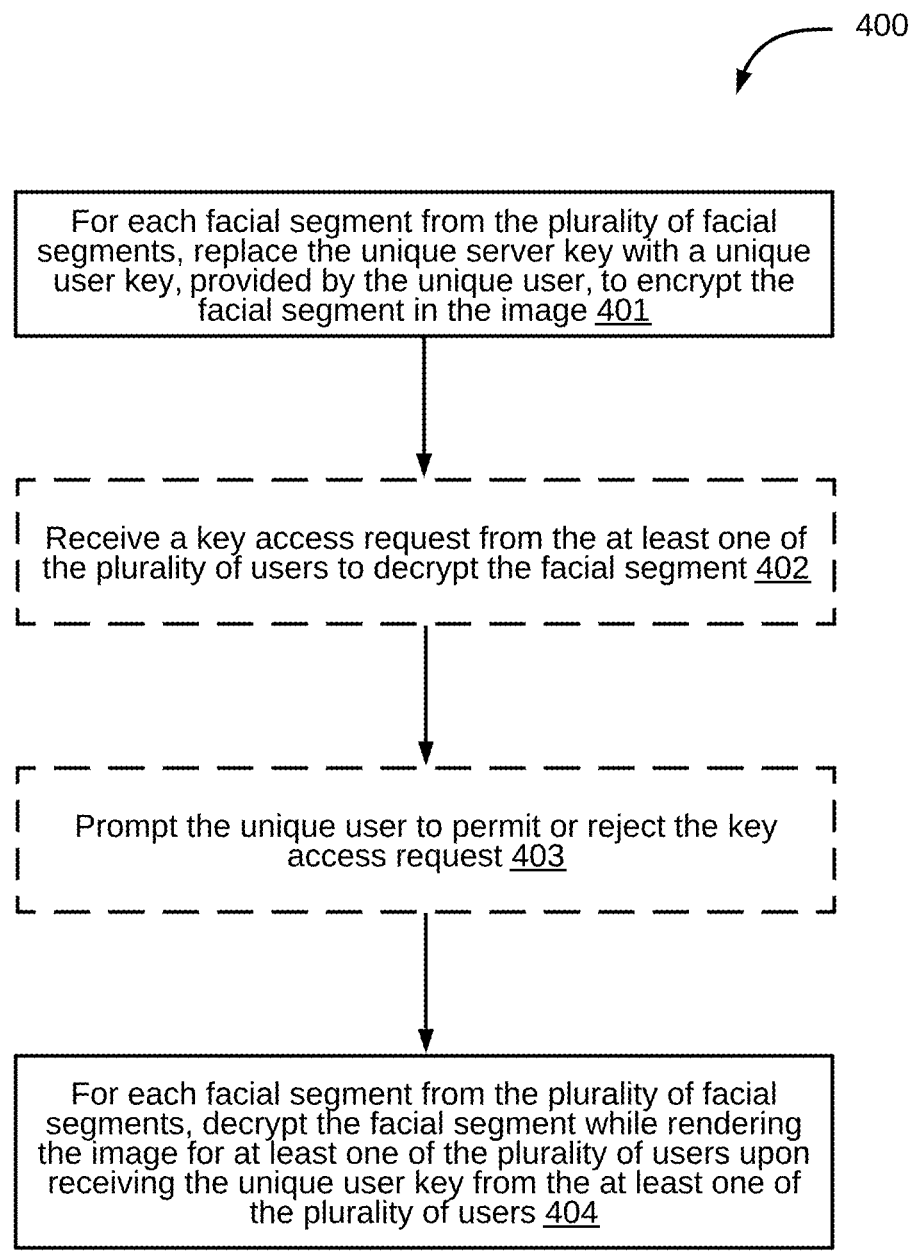
FIG. 4 is a flow diagram of an exemplary process for decrypting a facial segment while rendering an image upon receiving the unique user key, in accordance with some embodiments of the present disclosure.

Referring now to FIG. 4, an exemplary process 400 for decrypting a facial segment while rendering an image upon receiving the unique user key is depicted via a flow chart, in accordance with some embodiments of the present disclosure. The process 400 may be implemented by the image privacy protection device 101 of the system 100. The process 400 may include, for each facial segment from the plurality of facial segments, replacing the unique server key with a unique user key, provided by the unique user, to encrypt the facial segment in the image, at step 401. The unique user key may be configurable by the unique user. Further, the process 400 may include receiving a key access request from the at least one of the plurality of users to decrypt the facial segment, at step 402. Further, the process 400 may include prompting the unique user to permit or reject the key access request, at step 403. It may be noted that the unique server key or the unique user key is shared with the at least one of the plurality of users upon receiving the permit. Further, the process 400 may include, for each facial segment from the plurality of facial segments, decrypting the facial segment while rendering the image for at least one of the plurality of users upon receiving the unique user key from the at least one of the plurality of users, at step 404. The unique user key is shared with the at least one of the plurality of users by the unique user or upon permission from the unique user.

Figure 5:
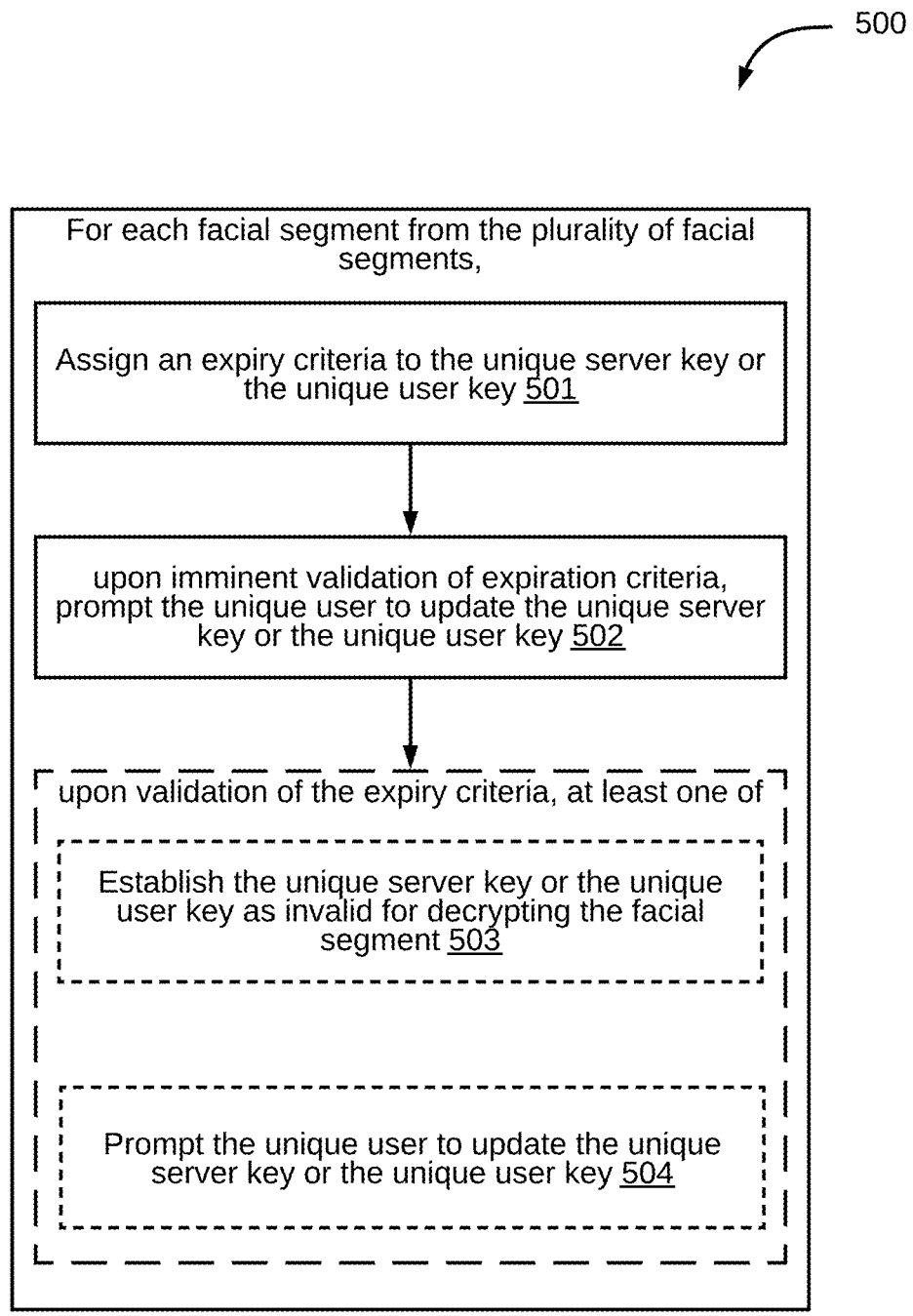
FIG. 5 is a flow diagram of an exemplary process for updating or invalidating a unique server key based on associated expiration criteria, in accordance with some embodiments of the present disclosure.

Referring now to FIG. 5, an exemplary process 500 for updating or invalidating a unique server key based on associated expiration criteria is depicted via a flow chart, in accordance with some embodiments of the present disclosure. The process 500 may be implemented by the image privacy protection device of the system 100. It may be noted that the process 500 may be iteratively performed for each facial segment from the plurality of facial segments. The process 500 may include assigning expiration criteria to the unique server key or the unique user key, at step 501. Further, the process 500 may include upon imminent validation of expiration criteria, prompting the unique user to update the unique server key or the unique user key, at step 502. For example, the prompting may include notifying the user regarding the imminent validation of the expiration criteria. Further, the process 500 may include, upon validation of the expiration criteria, establishing the unique server key or the unique user key as invalid for decrypting the facial segment, at step 503. In an embodiment, when the unique server key or the unique user key is invalidated, the protection frame may remain integrated with the image until the unique user may update the unique server key or the unique user key. Further, the process 500 may include, upon validation of the expiration criteria, prompting the unique user to update the unique server key or the unique user key, at step 504. It may be noted that the process 500 may include at least one of the step 503 and the step 504.

Figure 6:
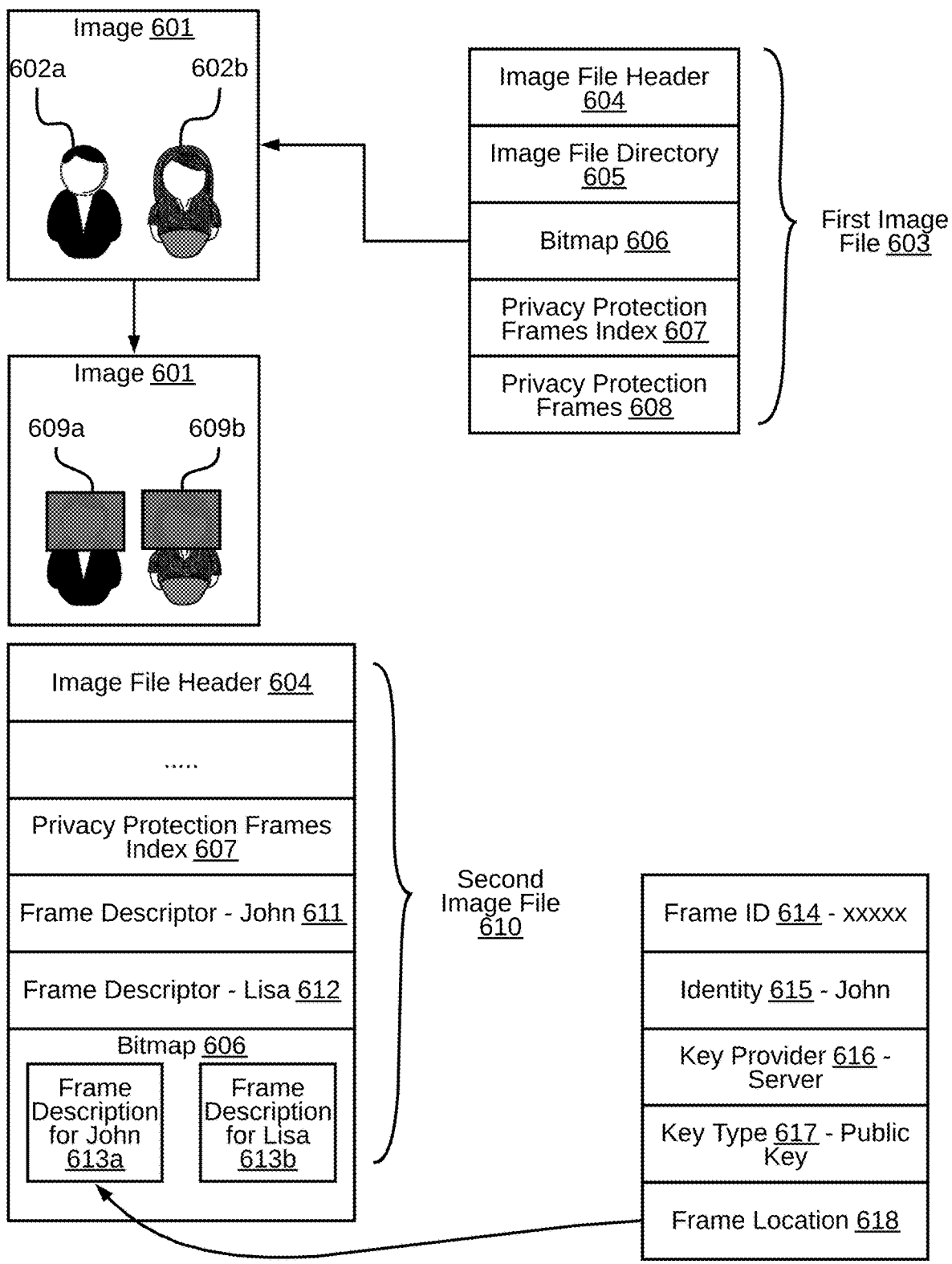
FIG. 6 illustrates generation of protection frames for facial segments in an image, in accordance with some embodiments of the present disclosure.

Referring now to FIG. 6, generation of protection frames for facial segments in an image 601 is illustrated, in accordance with some embodiments of the present disclosure. The image 601 may include a plurality of facial segments (for example, a facial segment 602a and a facial segment 602b). It may be noted that the image 601 may be rendered from a first image file 603. The first image file 603 may include an image file header 604, an image file directory 605, a bitmap 606, a privacy protection frames index 607, and a set of privacy protection frames 608. As will be appreciated, the bitmap 606 may include mapping of the image 601 in form of arrays of bits for rendering and storing the image 601 digitally.

In an embodiment, the privacy protection frames index 607, and the set of privacy protection frames 608 for the first image file 603 may be empty containers prior to encryption of each of the plurality of facial segments in the image 601 by the facial segment encryption module 203 and may be modifiable by the system 200. Upon identification of each of the plurality of facial segments and a unique user associated with each of the plurality of facial segments in the image 601 by the facial recognition module 202, the facial segment encryption module 203 may assign a unique server key to each of the plurality of facial segments to encrypt each of the plurality of facial segments in the image 601. It may be noted that the facial segment encryption module 203 may assign the unique server key to each of the plurality of facial segments either iteratively. By way of an example, the facial segment 602a corresponds to a user named "John" and the facial segment 602b corresponds to a user named "Lisa".

The system 200 may identify and associate each of the facial segment 602a and the facial segment 602b with "John" and "Lisa", respectively. Further, a protection frame 609a may be generated for the facial segment 602a and a protection frame 609a may be generated for the facial segment 602b. The image 601 including protection frames 609a and 609b may correspond to a second image file 610. In some embodiments, the system 200 may transform the first image file 603 to the second image file 610 upon encrypting each of the plurality of facial segments with a unique server key. It may be noted that the protection frame may be an opaque or a partially opaque layer of pixels to hide the facial segment in the image 601. In an embodiment, the privacy protection frames index 607 of the second image file 610 may include a frame descriptor for "John" 611 and a frame descriptor for "Lisa" 612.

Further, the protection frames 609a and 609b may be added to the bitmap 606 of the second image file 610. By way of an example, the bitmap 606 may include a frame description for John 613a and a frame description for Lisa 613b. The frame description for John 613a and the frame description for Lisa 613b are descriptions of the protection frames associated with the facial segments of "John" and "Lisa", respectively. In an embodiment, the frame description for John 613a may include a frame ID 614, an identity 615, a key provider 616, a key type 617, and a frame location 618. By way of an example, the frame ID 614 may be "xxxxx", the identity 615 may be "John", the key provider 616 may be "server", and the key type 617 may be "Public". It may be noted that the frame location 618 may indicate a location of the protection frame 609a in the image 601.

Figure 7:
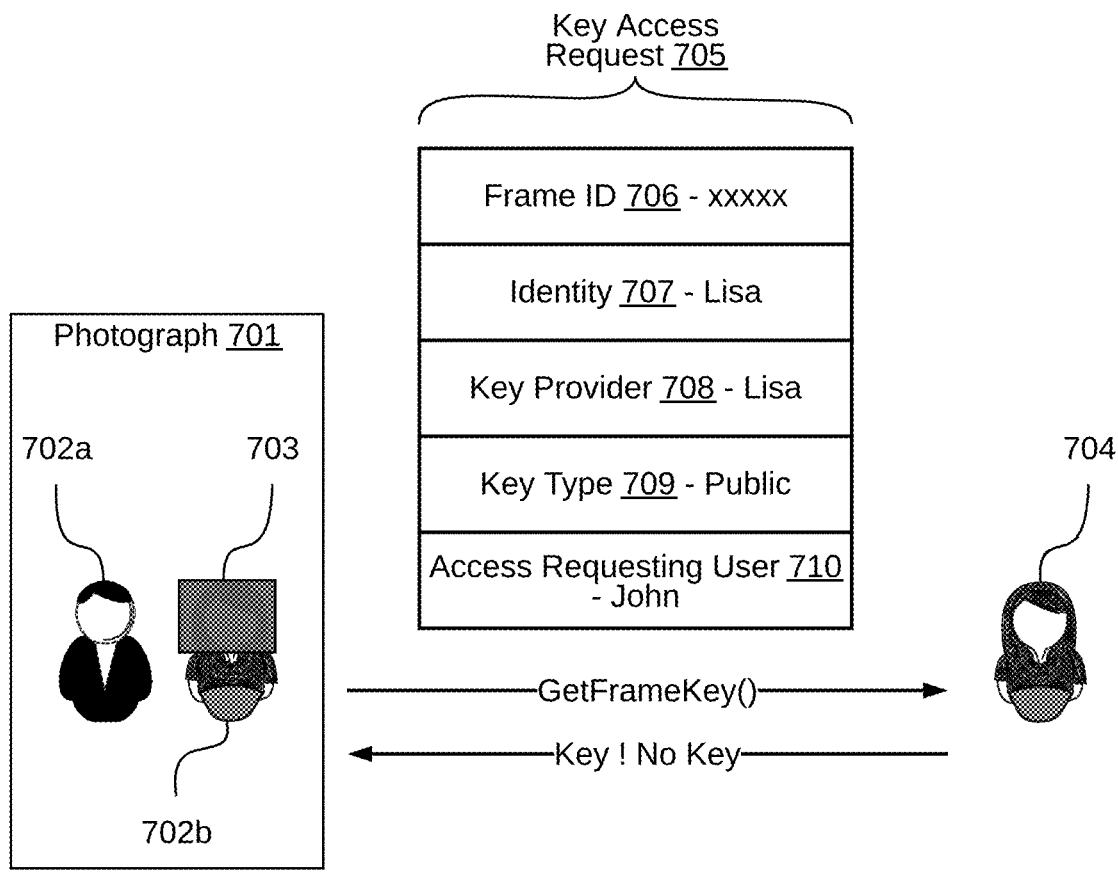
FIG. 7 illustrates decryption of protection frames for facial segments in a photograph for a user, in accordance with some embodiments of the present disclosure.

Referring now to FIG. 7, decryption of protection frames for facial segments in a photograph 701 for a user is illustrated, in accordance with some embodiments of the present disclosure. The photograph 701 may include a plurality of facial segments (for example, a facial segment 702a and a facial segment 702b). Upon identification of each of the plurality of facial segments in the photograph 701 and associating each of the plurality of facial segments with a unique user by the facial recognition module 202, the facial segment encryption module 203 may encrypt each of the plurality of facial segments with a unique server key. By way of an example, the facial segment 702b in the photograph 701 may be covered with a protection frame 703. It may be noted that the facial segment 702b may be associated with a unique user 704. The unique server key for the facial segment 702b may be stored in a server. Further, the unique server key may be shared with the unique user 704.

In an embodiment, the unique server key may be in form of a one-time password (OTP), which may be shared with the unique user 704. The unique user 704 may use the unique server key to generate a unique user key in form of a custom password or assign a predefined role (for example, a role of owner of the facial segment 702b) to the unique user 704. The unique user 704 may share the unique user key with a user interested in viewing the facial segment corresponding to the unique user 704 in the photograph 701. The unique user may define an expiration criteria for the unique user key. Upon validation of the expiration criteria, the unique user key may be established as invalid. In another embodiment, the unique server key may not be directly accessible to the unique user 704. In such an embodiment, the user interested in viewing the facial segment 702b may send a key access request 705 to the unique user 704. The unique user 704 may accept or decline the key access request 705 to the user.

The key access request 705 may be a predefined function (for example, "GetFrameKey( )"). Further, the key access request 705 may include a frame ID 706, an identity 707, a key provider 708, a key type 709, and an access requesting user 710. By way of an example, the frame ID 706 may be "xxxxx", the identity 707 may be "Lisa", the key provider 708 may be "Lisa", the key type 709 may be "public", and the access requesting user 710 may be "John". When the unique user 704 accepts the key access request 705 of the user, the facial segment 702b in the photograph 701 is decrypted and the user may view the facial segment 702b. On the other hand, when the unique user 704 rejects the key access request 705 of the user, the facial segment 702b in the photograph 701 remains encrypted and the user may not view the facial segment 702b.

Further, a second unique user (not shown in figure) associated with the facial segment 702a in the photograph 701 may view the facial segment 702a but may require acceptance of the key access request by the unique user 704 to view the facial segment 702b with the protection frame 703 removed. It may be noted that the server may send a notification to the second unique user and the unique user 704, when the photograph 701 is published. The unique user may open the photograph 701. Further, a request may be sent to the server for the unique server key associated with each of the facial segments 702a and 702b to render the photograph 701. The server, through an authentication mechanism and based on public/private key, may send the unique server key associated with the facial segment 702b to the unique user 704. The unique user 704 may view the facial segment 702b in the photograph 701 with the protection frame 703 removed. Further, the unique user 704 may select and authorize a set of users from the plurality of users to decrypt the facial segment 702b. Further, the protection frame 703 may be updated with the access information of the set of users and may encrypt the facial segment 702b with the unique user key. It may be noted that a unique user key may be generated by for each of a plurality of photographs including a facial segment associated with the unique user 704. The updated protection frame 703 may be sent to the server for future decryption requests of the facial segment 702b.

Figure 8:
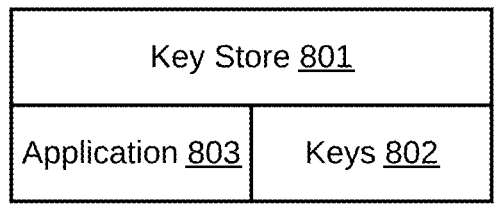
FIG. 8 illustrates a key store for storing and managing unique server keys and unique user keys associated with a plurality of users, in accordance with some embodiments of the present disclosure.

Referring now to FIG. 8, a key store 801 for storing and managing unique server keys and unique user keys associated with a plurality of users is illustrated, in accordance with some embodiments of the present disclosure. By way of an example, the key store 801 may store a plurality of keys 802 for an application 803. The application 803 may include a plurality of users. It may be noted that a plurality of photographs may be published through the application 803. Further, a set of photographs from the plurality of photographs may include facial segments. It may be noted that the application 803 may be implemented by the system 200. For each facial segment from the plurality of facial segments, the facial recognition module 202 may identify the facial segment in each of the plurality of photographs and associate the facial segment with a unique user. The facial segment encryption module 203 may encrypt the facial segment with a unique server key and share the unique server key with the unique user. The plurality of keys 802 may include the unique server key associated with each of the plurality of facial segments in each of the plurality of photographs in the application 802.

Further, the unique server key may include an expiration criteria. Upon validation of the expiration criteria, the unique server key may be established as inactive. By way of an example, the expiration criteria for a unique server key may be a time period (for example, 6 months, 2 years, etc.) from the date of publishing a photograph, a future date (for example, 12 Jul. 2025), deregistration of the unique user with the application 802, or the like. Upon imminent validation of the expiration criteria, the application 802 may notify the unique user and prompt the unique user to update the unique server key or the unique user key. It may be noted that when the unique user may update the unique server key or the unique user key, the updated unique server key or the unique user key may be added to the plurality of keys 803 in the key store 801. In an embodiment, upon validation of the expiration criteria, the application 802 may establish the unique server key or the unique user key as invalid for decrypting the facial segment. In such an embodiment, the unique server key or the unique user key may be removed from the plurality of keys 803 in the key store 801. It may be noted that the unique user may define a default mechanism for an automatic renewal or an automatic deletion of the unique user key upon validation of the expiration criteria.

Figure 9A:
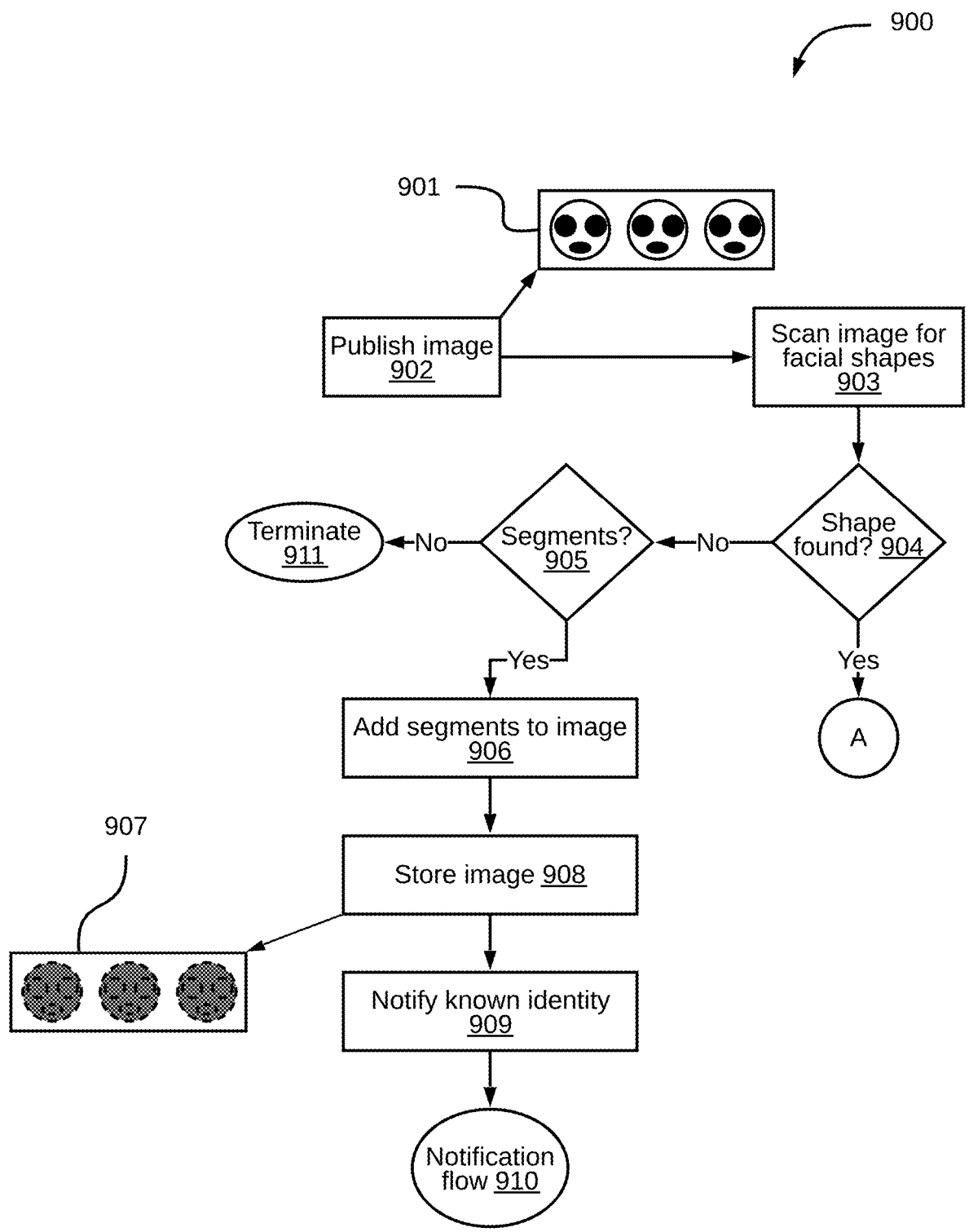
FIGS. 9A and 9B illustrate a flow diagram of an exemplary control logic for publishing and storing an image 901 with encrypted facial segments, in accordance with some embodiments of the present disclosure.
Figure 9B:
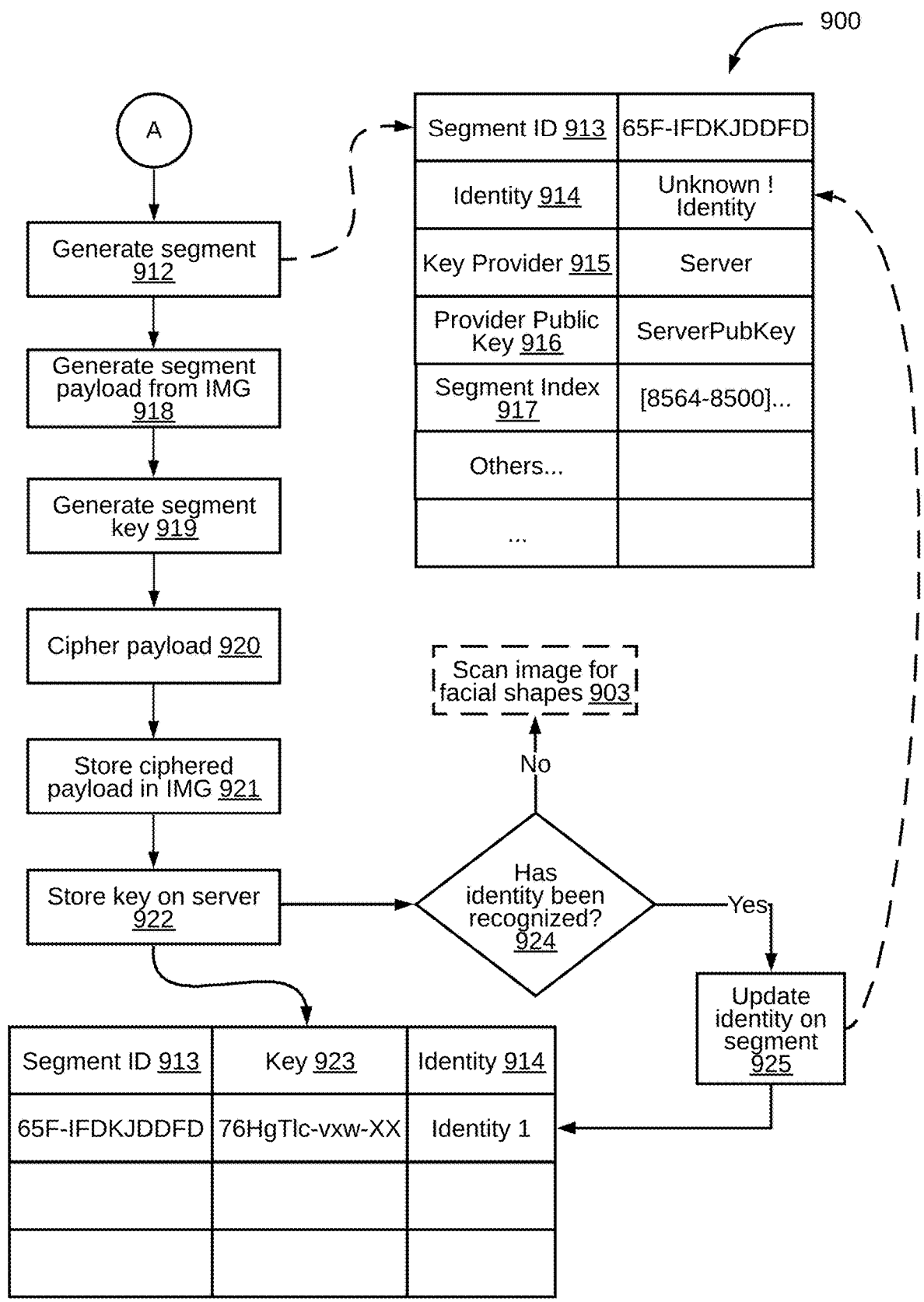

Referring now to FIGS. 9A and 9B, a control logic 900 for publishing and storing an image 901 with encrypted facial segments is illustrated via a flow chart, in accordance with some embodiments of the present disclosure. The control logic 900 may include, publishing the image 901, at step 902. Further, the image 901 may be scanned for facial shapes, at step 903. Further, at step 904, a check is performed to determine whether a facial shape is present in the image 901. If a facial shape is not present, another check is performed, at step 905, to determine whether segments are present in the image 901. It may be noted that the segments are analogous to the facial segments. If the segments are present, at step 906, the segments are added to an encrypted image 907. The encrypted image 907 is the image 901 with encryption for each of the plurality of facial segments in the image 901. Further, the encrypted image 907 is stored in a database, at step 908. Additionally, known identity may be notified, at step 909, via a notification flow 910.

If the segments are not present in the image 901, the control logic terminates, at step 911. Further, if a facial shape is present in the image 901, a segment is generated for the facial shape, at step 912. The generated segment may be represented in a bitmap of the encrypted image 907. In an embodiment, the generated segment may include a segment ID 913, an identity 914, a key provider 915, a provider public key 916, a segment index 917, and other parameters. By way of an example, the segment ID 913 may be "65F-IFDKJDDFD", the identity 914 may be "Unknown ! Identity", the key provider 915 may be "server", the provider public key 916 may be "ServerPubKey", and the segment index 917 may be "[8564-8500] . . . ". Further, a payload of the segment if generated from the image 901, at step 918. Further, a segment key is generated, at step 919. The segment key is analogous to the unique server key. Further, the payload may be ciphered, at step 920. It may be noted that ciphering of payload may be analogous to encryption of a facial segment by the system 200. Additionally, the ciphered payload may be stored in the image, at step 921. Further, the key may be stored on server, at step 922. In an embodiment, the key may be stored in a database including the segment ID 913, the key 923, and the identity 914. Further, a check is performed, at step 924, to determine whether the identity is recognized. If the identity is not recognized, the process returns to the step 903. If the identity is recognized, the identity 914 is updated in the segment. By way of an example, the identity may be "Identity 1".

Figure 10:
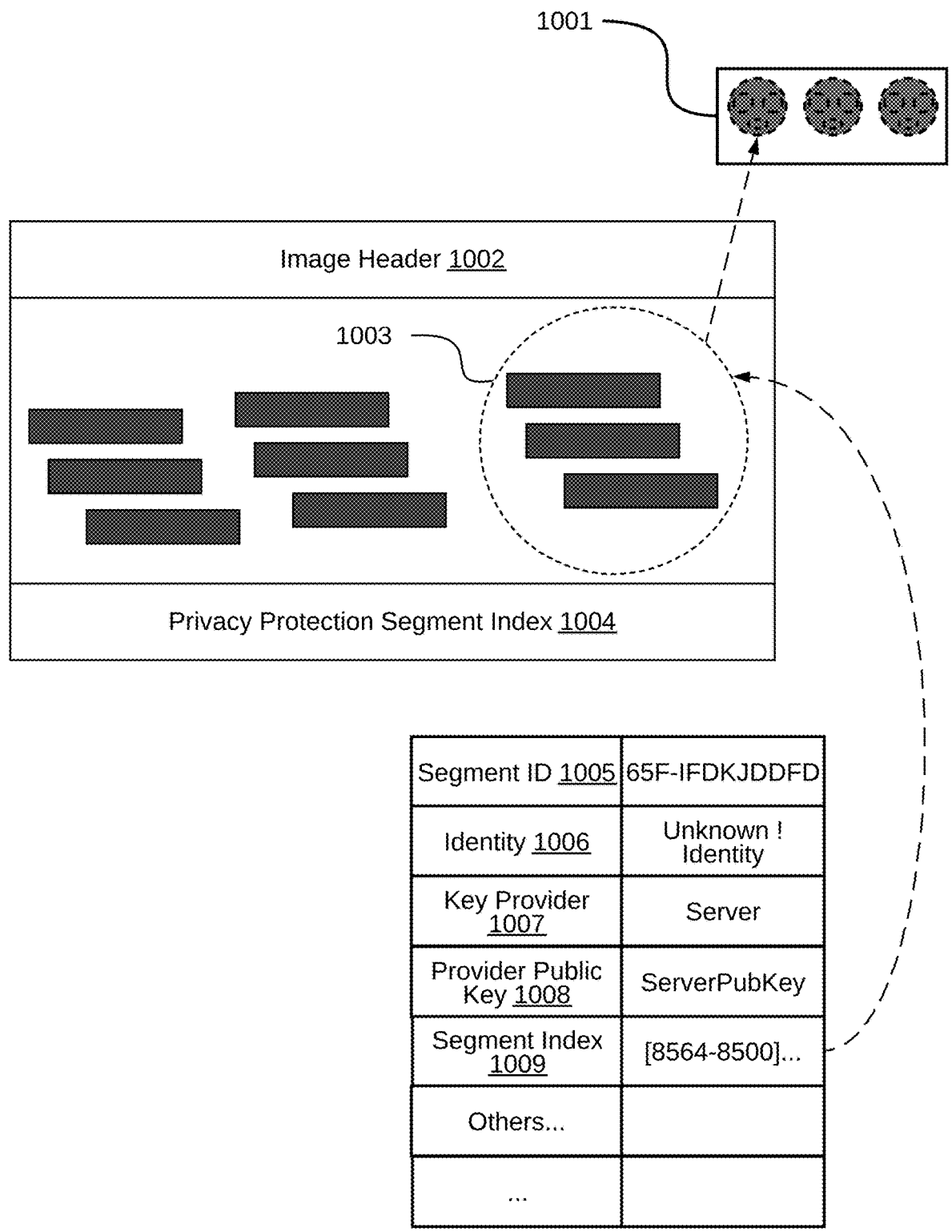
FIG. 10 illustrates addition of protection frames to facial segments in an image, in accordance with some embodiments of the present disclosure.

Referring now to FIG. 10, addition of protection frames to facial segments in an image 1001 is illustrated, in accordance with some embodiments of the present disclosure. The image 1001 includes a plurality of facial segments. Further, an image file associated with the image 1001 may include an image header 1002, a description for each of the plurality of facial segments (for example, a facial segment description 1003), and a privacy protection segment index. It may be noted that the image 1001 is encrypted with a unique server key and published. The facial segment description 1003 may include a segment ID 1005, an identity 1006, a key provider 1007, a provider public key 1008, a segment index 1009, and other parameters. By way of an example, the segment ID 1005 may be "65F-IFDKJDDFD", the identity 1006 may be "Unknown ! Identity", the key provider 1007 may be "server", the provider public key 1008 may be "ServerPubKey", and the segment index 1009 may be "[8564-8500] . . . ".

Figure 11A:
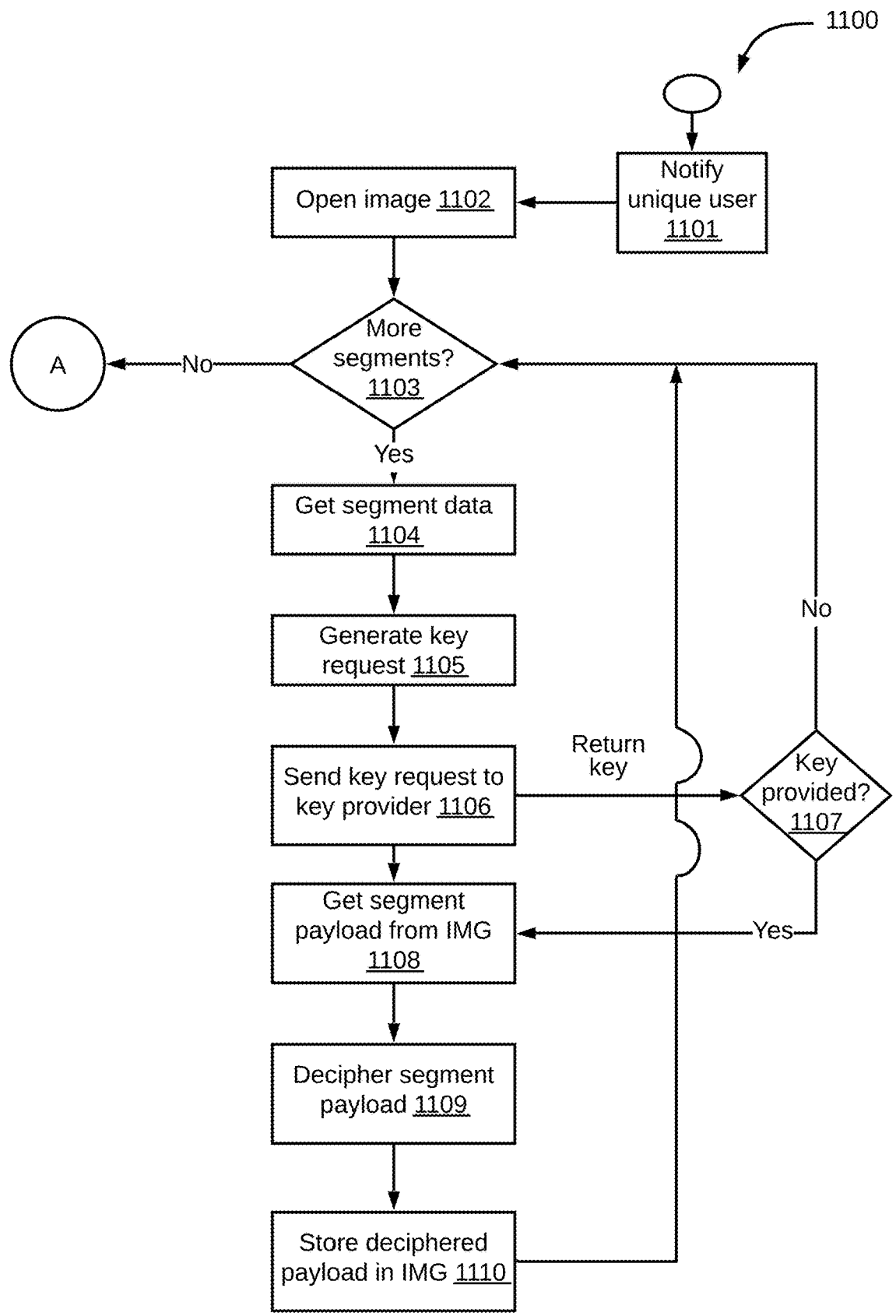
FIGS. 11A and 11B illustrate a flow diagram of an exemplary control logic for rendering an image for a user, in accordance with some embodiments of the present disclosure.
Figure 11B:
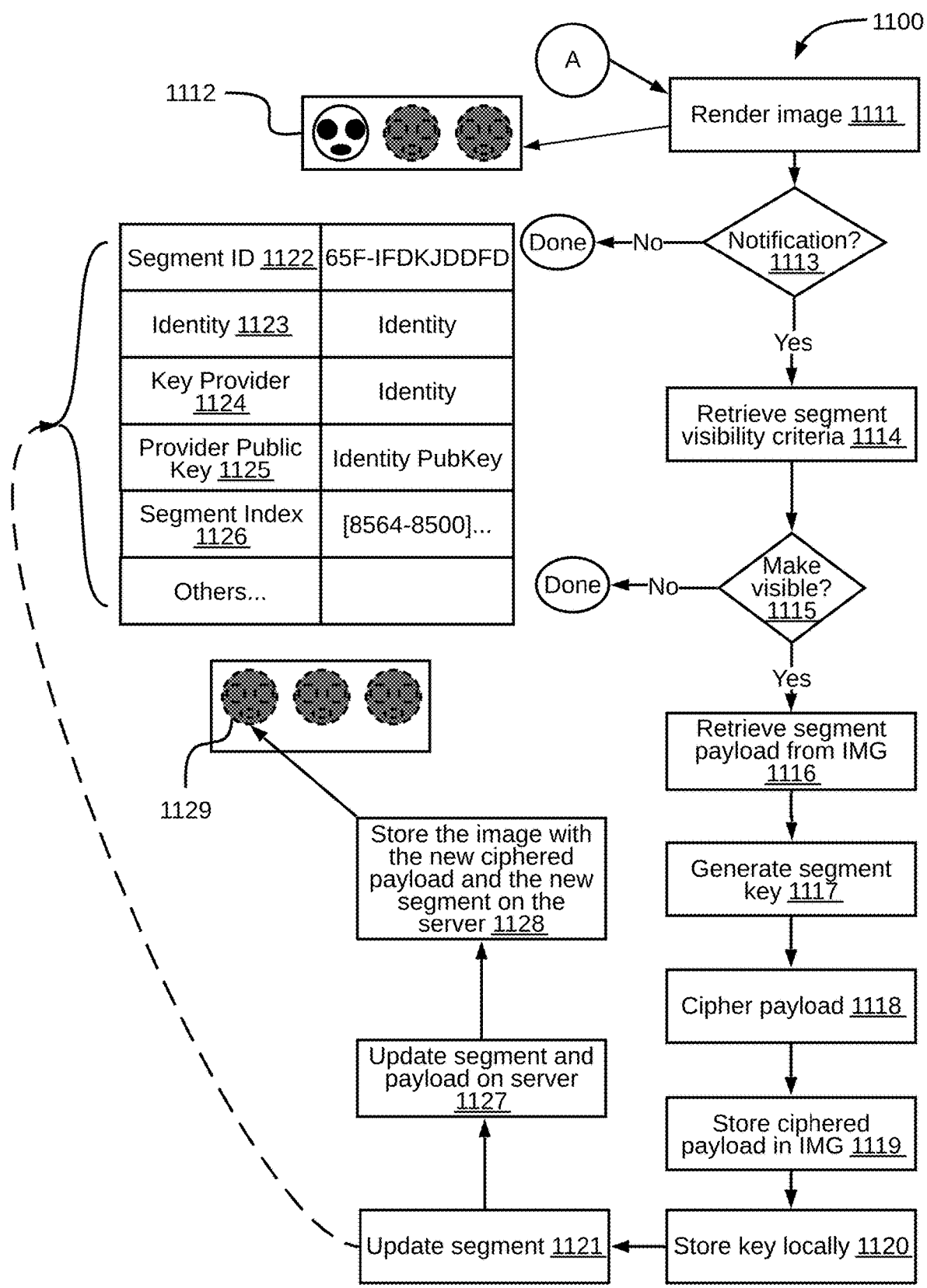

Referring now to FIGS. 11A and 11B, an exemplary control logic 1100 for rendering an image for a user is illustrated via a flow chart, in accordance with some embodiments of the present disclosure. When an image is published, a unique server key may be shared with the unique user associated with each of the plurality of facial segments in the image. The unique user may request for rendering an image. The control logic 1100 includes, at step 1101, notifying unique user. Further, the control logic 1100 may include opening the image, at step 1102. Further, a check may be performed at step 1103 to determine whether more segments are present in the image. If more segments are present in the image, the control logic 1100 may include getting segment data, at step 1104.

Further, a key request may be generated, at step 1105. Further, at step 1106, the key request may be sent to a key provider. The key provider may be the server or the unique user. When the key provider is the server, the facial segment is decrypted when the user is the unique user. The facial segment may not be decrypted when the user is other than the unique user. When the key provider is the unique user, the facial segment is decrypted based on segment visibility criteria defined by the unique user. For example, the segment visibility criteria may be a list of users defined by the unique user. When the user may be amongst the list of users, the facial segment may be decrypted. Further, at step 1107, a check may be performed to determine whether a key is provided by the key provider. If the key is not provided by the key provider, step 1103 of the process may be repeated. If the key is provided by the key provider, the control logic 1100 may include getting segment payload from the image, at step 1108.

Further, the segment payload may be deciphered, at step 1109. It may be noted that the deciphering is analogous to the decrypting performed by the system 200. Further, the deciphered payload may be stored in the image, at step 1110. It may be noted that that the steps 1103-1110 may be iteratively performed for each of the plurality of facial segments in the image. Further, at step 1111, the image may be rendered when at step 1103, if more segments are not present in the image. The rendered image 1112 may include decrypted facial segments from the plurality of facial segments in the image when the user meets the segment visibility criteria for each of the decrypted facial segments. Further, at step 1113, a check is performed to determine whether a notification is sent to the unique user. If the notification is not sent to the unique user, the control logic 1100 terminates. If the notification is sent to the unique user, segment visibility criteria may be retrieved, at step 1114. The segment visibility criteria may be defined by the key provider. By way of an example, the segment visibility criteria may be "nobody", "everybody", "only on picture", "my friends only", "custom", or the like.

Further, at step 1115, a check is performed to determine whether the segment may be made visible to the user. If the segment may not be made visible to the user, the control logic 1100 terminates. If the segment may be made visible to the user, segment payload is retrieved from the image, at step 1116. Further, a segment key is generated, at step 1117. Further, the segment payload is ciphered, at step 1118. It may be noted that the ciphering is analogous to the encrypting of the facial segment by the system 200. Further, ciphered payload is stored in the image, at step 1119. Additionally, the key is stored locally, at step 1120. Further, the segment may be updated, at step 1121. The updated segment may include a segment ID 1122, an identity 1123, a key provider 1124, a provider public key 1125, a segment index 1126, and other parameters. By way of an example, the segment ID 1122 may be "65F-IFDKJDDFD", the identity 1123 may be "Identity", the key provider 1124 may be "Identity", the provider public key 1125 may be "Identity PubKey", and the segment index 1126 may be "[8564-8500] . . .".

Further, at step 1127, the segment and payload are updated on server. Additionally, at step 1128, image is stored with new ciphered payload and new segment 1129 on the server. It may be noted that the key provider for the new segment 1129 may be the unique user (for example, "Identity") associated with the new segment 1129. Further, when a user may send a key request to render the image 1112, the unique user may be prompted to accept or reject the key request of the user.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 12:
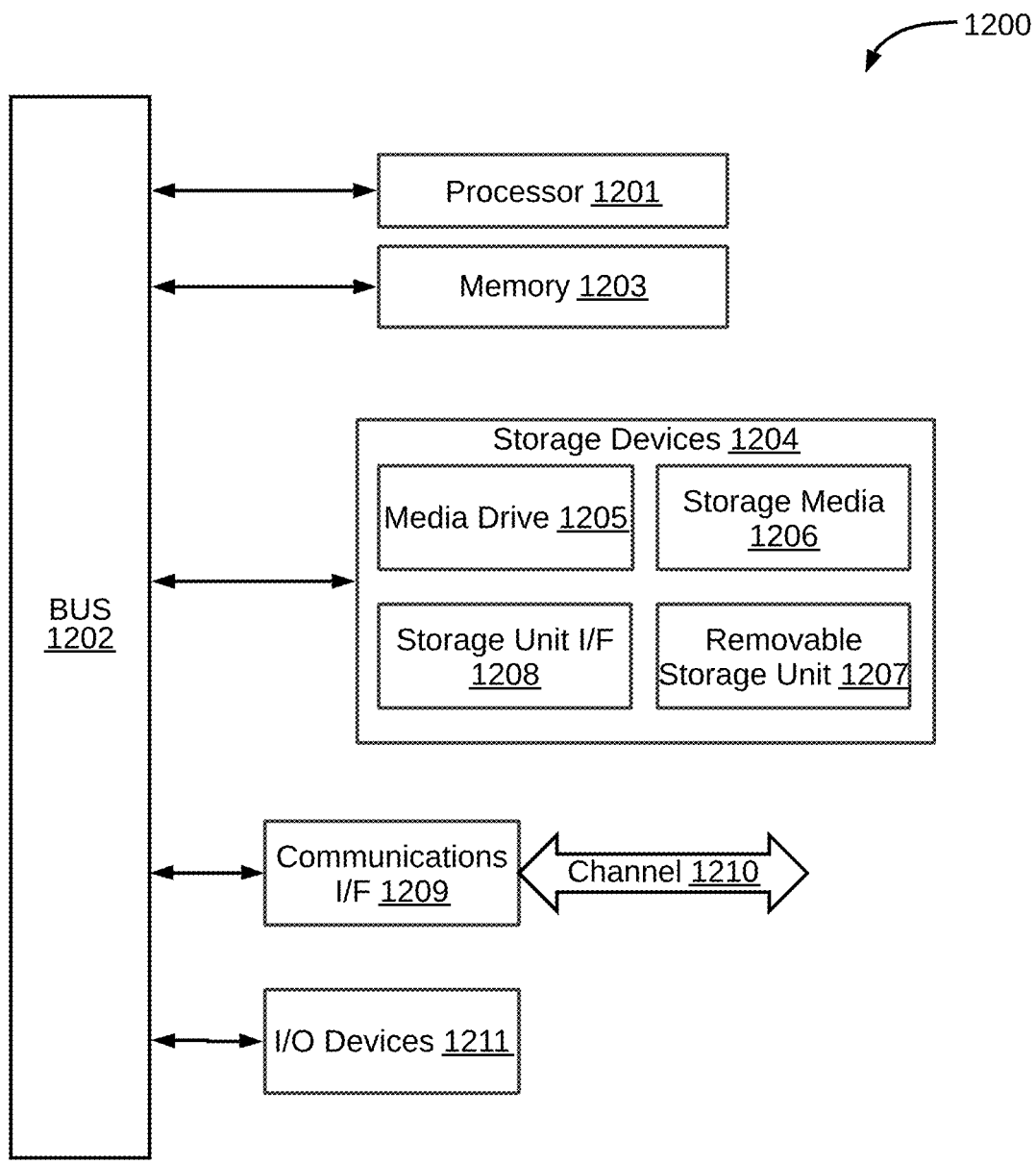
FIG. 12 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 12, an exemplary computing system 1200 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 1200 may represent, for example, a user device such as a desktop, a laptop, a mobile phone, personal entertainment device, DVR, and so on, or any other type of special or general-purpose computing device as may be desirable or appropriate for a given application or environment. The computing system 1200 may include one or more processors, such as a processor 1201 that may be implemented using a general or special purpose processing engine such as, for example, a microprocessor, microcontroller or other control logic. In this example, the processor 1201 is connected to a bus 1202 or other communication medium. In some embodiments, the processor 1201 may be an Artificial Intelligence (AI) processor, which may be implemented as a Tensor Processing Unit (TPU), or a graphical processor unit, or a custom programmable solution Field-Programmable Gate Array (FPGA).

The computing system 1200 may also include a memory 1203 (main memory), for example, Random Access Memory (RAM) or other dynamic memory, for storing information and instructions to be executed by the processor 1201. The memory 1203 also may be used for storing temporary variables or other intermediate information during execution of instructions to be executed by the processor 1201. The computing system 1200 may likewise include a read only memory ("ROM") or other static storage device coupled to bus 1202 for storing static information and instructions for the processor 1201.

The computing system 1200 may also include a storage devices 1204, which may include, for example, a media drive 1205 and a removable storage interface. The media drive 1205 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 1206 may include, for example, a hard disk, magnetic tape, flash drive, or other fixed or removable medium that is read by and written to by the media drive 1205. As these examples illustrate, the storage media 1206 may include a computer-readable storage medium having stored therein particular computer software or data.

In alternative embodiments, the storage devices 1204 may include other similar instrumentalities for allowing computer programs or other instructions or data to be loaded into the computing system 1200. Such instrumentalities may include, for example, a removable storage unit 1207 and a storage unit interface 1208, such as a program cartridge and cartridge interface, a removable memory (for example, a flash memory or other removable memory module) and memory slot, and other removable storage units and interfaces that allow software and data to be transferred from the removable storage unit 1207 to the computing system 1200.

The computing system 1200 may also include a communications interface 1209. The communications interface 1209 may be used to allow software and data to be transferred between the computing system 1200 and external devices. Examples of the communications interface 1209 may include a network interface (such as an Ethernet or other NIC card), a communications port (such as for example, a USB port, a micro USB port), Near field Communication (NFC), etc. Software and data transferred via the communications interface 1209 are in the form of signals which may be electronic, electromagnetic, optical, or other signals capable of being received by the communications interface 1209. These signals are provided to the communications interface 1209 via a channel 1210. The channel 1210 may carry signals and may be implemented using a wireless medium, wire or cable, fiber optics, or other communications medium. Some examples of the channel 1210 may include a phone line, a cellular phone link, an RF link, a Bluetooth link, a network interface, a local or wide area network, and other communications channels.

The computing system 1200 may further include Input/ Output (I/O) devices 1211. Examples may include, but are not limited to a display, keypad, microphone, audio speakers, vibrating motor, LED lights, etc. The I/O devices 1211 may receive input from a user and also display an output of the computation performed by the processor 1201. In this document, the terms "computer program product" and "computer-readable medium" may be used generally to refer to media such as, for example, the memory 1203, the storage devices 1204, the removable storage unit 1207, or signal(s) on the channel 1210. These and other forms of computer-readable media may be involved in providing one or more sequences of one or more instructions to the processor 1201 for execution. Such instructions, generally referred to as "computer program code" (which may be grouped in the form of computer programs or other groupings), when executed, enable the computing system 1200 to perform features or functions of embodiments of the present invention.

In an embodiment where the elements are implemented using software, the software may be stored in a computer-readable medium and loaded into the computing system 1200 using, for example, the removable storage unit 1207, the media drive 1205 or the communications interface 1209. The control logic (in this example, software instructions or computer program code), when executed by the processor 1201, causes the processor 1201 to perform the functions of the invention as described herein.

Thus, the disclosed method and system try to overcome the technical problem of encrypting and decrypting a facial segment in an image with a unique server key. The method and system provide individual control over privacy of a user in an image by associating a facial segment in the image with the user and sharing a unique server key with the user. The user may generate a unique user key through the unique server key. Further, the facial segment corresponding to the user may be covered with a protection frame. The protection frame may be an opaque or a partially opaque layer of pixels to cover the facial segment. When a second user is interested in viewing the facial segment corresponding to the user in the image, the second user may send a key access request to the user. The user may accept or reject the key access request. Upon acceptance of the key access request by the user, the protection frame may be removed and the second user may view the facial segment corresponding to the user in the image. Thus, in images with multiple facial segments, the privacy for each facial segment is in control of the user associated with the facial segment.

As will be appreciated by those skilled in the art, the techniques described in the various embodiments discussed above are not routine, or conventional, or well understood in the art. The techniques discussed above provide for encrypting and decrypting a facial segment in an image with a unique server key. The techniques first identify a plurality of facial segments in the image through a facial recognition algorithm and associate each of the plurality of facial segments with a unique user. The techniques may then encrypt each of the plurality of facial segments with a unique server key. The unique server key may be shared with the unique user. The techniques may then generate a protection frame for each of the plurality of facial segments. The protection frame is an opaque or a partially opaque layer of pixels to cover a facial segment. The techniques may then decrypt a facial segment while rendering the image for a user upon receiving the unique server key or the unique user key for the corresponding facial segment from the user. The protection frame may be removed via the unique server key or the unique user key.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for encrypting and decrypting a facial segment in an image with a unique server key. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for encrypting and decrypting a facial segment in an image with a unique server key, the method comprising:
    receiving, by an image privacy protection device, an image from one of a plurality of users, wherein the image comprises a plurality of facial segments;
    for each facial segment from the plurality of facial segments,
        identifying, by the image privacy protection device, a unique user associated with the facial segment using a facial recognition algorithm, wherein the unique user is one of the plurality of users;
        encrypting, by the image privacy protection device, the facial segment with a unique server key, wherein the unique server key is shared with the unique user;

generating, by the image privacy protection device, a protection frame, unlockable with the unique server key, to cover the facial segment, wherein the protection frame comprises an opaque or a partially opaque layer of pixels to hide the facial segment from the plurality of users; and decrypting, by the image privacy protection device, the facial segment while rendering the image for at least one of the plurality of users upon receiving the unique server key from the at least one of the plurality of users, wherein the unique server key is shared with the at least one of the plurality of users by the unique user or upon permission from the unique user.

2. The method of claim 1, wherein decrypting the facial segment further comprises:

receiving the unique server key from each of the at least one of the plurality of users; and removing the protection frame from the facial segment while rendering the image for each of the at least one of the plurality of users.

3. The method of claim 1, further comprising:

for each facial segment from the plurality of facial segments, replacing, by the image privacy protection device, the unique server key with a unique user key, provided by the unique user, to encrypt the facial segment in the image, wherein the unique user key is configurable by the unique user; and decrypting, by the image privacy protection device, the facial segment while rendering the image for at least one of the plurality of users upon receiving the unique user key from the at least one of the plurality of users, wherein the unique user key is shared with the at least one of the plurality of users by the unique user or upon permission from the unique user.

4. The method of claim 3, further comprising:

for each facial segment from the plurality of facial segments, assigning, by the image privacy protection device, an expiry criteria to the unique server key or the unique user key;

upon imminent validation of expiration criteria, prompting, by the image privacy protection device, the unique user to update the unique server key or the unique user key; and upon validation of the expiry criteria, at least one of:
establishing, by the image privacy protection device, the unique server key or the unique user key as invalid for decrypting the facial segment; and
prompting, by the image privacy protection device, the unique user to update the unique server key or the unique user key.

5. The method of claim 3, further comprising:

receiving, by the image privacy protection device, a key access request from the at least one of the plurality of users to decrypt the facial segment; and prompting, by the image privacy protection device, the unique user to permit or reject the key access request, wherein the unique server key or the unique user key is shared with the at least one of the plurality of users upon receiving the permit.

6. A system for encrypting and decrypting a facial segment in an image with a unique server key, the system comprising:

a processor; and a memory communicatively coupled to the processor, wherein the memory stores processor instructions, which when executed by the processor, cause the processor to:

receive an image from one of a plurality of users, wherein the image comprises a plurality of facial segments;

for each facial segment from the plurality of facial segments, identify a unique user associated with the facial segment using a facial recognition algorithm, wherein the unique user is one of the plurality of users;

encrypt the facial segment with a unique server key, wherein the unique server key is shared with the unique user;

generate a protection frame, unlockable with the unique server key, to cover the facial segment, wherein the protection frame comprises an opaque or a partially opaque layer of pixels to hide the facial segment from the plurality of users; and decrypt the facial segment while rendering the image for at least one of the plurality of users upon receiving the unique server key from the at least one of the plurality of users, wherein the unique server key is shared with the at least one of the plurality of users by the unique user or upon permission from the unique user.

7. The system of claim 6, wherein to decrypt the facial segment, the processor instructions, on execution, further cause the processor to:

receive the unique server key from each of the at least one of the plurality of users; and remove the protection frame from the facial segment while rendering the image for each of the at least one of the plurality of users.

8. The system of claim 6, wherein the processor instructions, on execution, further cause the processor to:

for each facial segment from the plurality of facial segments, replace the unique server key with a unique user key, provided by the unique user, to encrypt the facial segment in the image, wherein the unique user key is configurable by the unique user; and decrypt the facial segment while rendering the image for at least one of the plurality of users upon receiving the unique user key from the at least one of the plurality of users, wherein the unique user key is shared with the at least one of the plurality of users by the unique user or upon permission from the unique user.

9. The system of claim 8, wherein the processor instructions, on execution, further cause the processor to:

for each facial segment from the plurality of facial segments, assign an expiry criteria to the unique server key or the unique user key;

upon imminent validation of expiration criteria, prompt the unique user to update the unique server key or the unique user key; and upon validation of the expiry criteria, at least one of:
establish the unique server key or the unique user key as invalid for decrypting the facial segment; and
prompt the unique user to update the unique server key or the unique user key.

10. The system of claim 8, wherein the processor instructions, on execution, further cause the processor to:
  receive a key access request from the at least one of the plurality of users to decrypt the facial segment; and
  prompt the unique user to permit or reject the key access request, wherein the unique server key or the unique user key is shared with the at least one of the plurality of users upon receiving the permit.

11. A non-transitory computer-readable medium storing computer-executable instructions for encrypting and decrypting a facial segment in an image with a unique server key, the computer-executable instructions configured for:
  receiving an image from one of a plurality of users, wherein the image comprises a plurality of facial segments;
  for each facial segment from the plurality of facial segments,
    identifying a unique user associated with the facial segment using a facial recognition algorithm, wherein the unique user is one of the plurality of users;
    encrypting the facial segment with a unique server key, wherein the unique server key is shared with the unique user;
    generating a protection frame, unlockable with the unique server key, to cover the facial segment, wherein the protection frame comprises an opaque or a partially opaque layer of pixels to hide the facial segment from the plurality of users; and
    decrypting the facial segment while rendering the image for at least one of the plurality of users upon receiving the unique server key from the at least one of the plurality of users, wherein the unique server key is shared with the at least one of the plurality of users by the unique user or upon permission from the unique user.

12. The non-transitory computer-readable medium of claim 11, wherein for decrypting the facial segment, the computer-executable instructions are further configured for:
  receiving the unique server key from each of the at least one of the plurality of users; and
  removing the protection frame from the facial segment while rendering the image for each of the at least one of the plurality of users.

13. The non-transitory computer-readable medium of claim 11, wherein the computer-executable instructions are further configured for:
  for each facial segment from the plurality of facial segments,
    replacing the unique server key with a unique user key, provided by the unique user, to encrypt the facial segment in the image, wherein the unique user key is configurable by the unique user; and
    decrypting the facial segment while rendering the image for at least one of the plurality of users upon receiving the unique user key from the at least one of the plurality of users, wherein the unique user key is shared with the at least one of the plurality of users by the unique user or upon permission from the unique user.

14. The non-transitory computer-readable medium of claim 13, wherein the computer-executable instructions are further configured for:
  for each facial segment from the plurality of facial segments,
    assigning an expiry criteria to the unique server key or the unique user key;
    upon imminent validation of expiration criteria, prompting the unique user to update the unique server key or the unique user key; and
    upon validation of the expiry criteria, at least one of:
      establishing the unique server key or the unique user key as invalid for decrypting the facial segment; and
      prompting the unique user to update the unique server key or the unique user key.

15. The non-transitory computer-readable medium of claim 13, wherein the computer-executable instructions are further configured for:
  receiving a key access request from the at least one of the plurality of users to decrypt the facial segment; and
  prompting the unique user to permit or reject the key access request, wherein the unique server key or the unique user key is shared with the at least one of the plurality of users upon receiving the permit.

* * * * *